United States Patent [19]

Ishimoto et al.

[11] Patent Number: 5,479,566
[45] Date of Patent: Dec. 26, 1995

[54] MICROCOMPUTER INTERNALLY HAVING FUZZY INFERENCE EXCLUSIVE-INSTRUCTIONS

[75] Inventors: Satomi Ishimoto; Hajime Sakuma, both of Tokyo, Japan

[73] Assignee: NEC Corporation, Tokyo, Japan

[21] Appl. No.: 163,055

[22] Filed: Dec. 6, 1993

[30] Foreign Application Priority Data

Dec. 4, 1992 [JP] Japan ............................ 4-325132

[51] Int. Cl.$^6$ ............................................ G06F 15/18
[52] U.S. Cl. ........................ 395/3; 395/51; 395/61; 395/900
[58] Field of Search ........................ 395/3, 11, 51, 395/61, 22–23, 900, 906, 908

[56] References Cited

U.S. PATENT DOCUMENTS

| | | | |
|---|---|---|---|
| 3,364,471 | 1/1968 | Bienhoff et al. | 340/172.5 |
| 5,202,954 | 4/1993 | Miyazawa et al. | 395/3 |
| 5,239,616 | 8/1993 | Hisano | 395/3 |
| 5,263,125 | 11/1993 | Viot et al. | 395/3 |
| 5,305,424 | 4/1994 | Ma et al. | 395/51 |
| 5,305,425 | 4/1994 | Ishida et al. | 395/51 |
| 5,335,314 | 8/1994 | Tsutsumi et al. | 395/3 |
| 5,388,190 | 2/1995 | Nakano | 395/61 |

FOREIGN PATENT DOCUMENTS

0574713A2  12/1993  European Pat. Off. .......... G06F 7/48

OTHER PUBLICATIONS

Chen et al, "Modeling and simulation of a parameterized fuzzy processor"; 1992 IEEE International Symposium on Circuits and Systems, pp. 915–918 vol. 2, 10–13 May 1992.

Patent Abstracts of Japan, vol. 015, No. 309 (P–1235) 7 Aug. 1991 & JP-A-03 109 605 (Meidensha Corp); 9 May 1991 (abstract).

H. Watanabe; "RISC Approach to Design of Fuzzy Processor Architecture"; IEEE International Conference on Fuzzy Systems, Mar. 1992; pp. 431–441 (Cat No. 92 CH3073-4).

*Primary Examiner*—David K. Moore
*Assistant Examiner*—Tariq Rafiq Hafiz
*Attorney, Agent, or Firm*—Whitham, Curtis, Whitham & McGinn

[57] ABSTRACT

In a microcomputer including a processor, a data memory and a controller for controlling the processor and the data memory, the data memory includes a adaptivity degree data group indicative of the adaptivity degree to the fuzzy set, and an area for storing the result of processing. The processor includes an adaptivity degree data pointer, a result store area pointer, a conformity degree data storing register, and a processing number count register. The microcomputer internally includes a fuzzy inference exclusive-instruction, which causes to compare data in the conformity degree data storing register with data designated by the adaptivity degree data pointer, so as to select a smaller one, and compare the selected dam with data designated by the result store area pointer, so as to store a large one at the area for storing the result of processing, designated by the the result store area pointer. The above processings are repealed the number of processing in the processing number count register, while updating the result store area pointer and the adaptivity degree data group pointer.

4 Claims, 3 Drawing Sheets

MICROCOMPUTER INTERNALLY HAVING FUZZY INFERENCE EXCLUSIVE-INSTRUCTIONS

BACKGROUND OF THE INVENTION

1. Field of the Invention

The present invention relates to a microcomputer having a fuzzy operation function.

2. Description of Related Art

In the case of controlling some object to some set value, a fuzzy inference has been known in which, at which degree a current measured value is adaptive to a plurality of conditions is discriminated, and a controlled manipulated variable is inferred on the basis of the discrimination. Here, these conditions can have vague expressions.

General fuzzy inference includes a Max-Min method Here, assuming that a difference between a set value and a measured value is E, a change component during one sampling period is $\Delta E$, and a manipulated variable at this time is $\Delta U$, control is performed in accordance with the following three rules:

RULE 1: If E is negative and slightly large and if $\Delta E \approx 0$, $\Delta U$ is positive and slightly large.

RULE 2: If $E \approx 0$, and if $\Delta E$ is positive and slightly large, $\Delta U$ is negative and slightly large.

RULE 3: If $E \approx 0$, and if $\Delta E \approx 0$, $\Delta U \approx 0$.

Under this condition, a method for determining the manipulated variable $\Delta U$ in accordance with the Max-Min method will be described with reference to FIG. 1. In all graphs shown in FIG. 1, the axis of ordinates shows the adaptivity degree $\mu$ for the fuzzy set. This adaptivity degree $\mu$ is indicative of the degree by which the elements (E, $\Delta E$, $\Delta U$) belong to the fuzzy set. If the elements completely belongs to the fuzzy set, $\mu=1$. If the elements do not belong to the fuzzy set at all, $\mu=0$.

Graphs 3-11 and 3-23 are a fuzzy set in which E is negative and slightly large. Graphs 3-12, 3-21, 3-31, 3-32 and 3-33 are a fuzzy set in which E is almost 0, and graphs 3-13 and 3-22 are a fuzzy set in which E is positive and slightly large.

In addition, the graphs 3-11, 3-12 and 3-13 indicate the conditions E and $\Delta E$ and the manipulated variable $\Delta U$ for RULE 1. The graphs 3-21, 3-22 and 3-23 indicate the conditions E and $\Delta E$ and the manipulated variable $\Delta U$ for RULE 2, and the graphs 3-31, 3-32 and 3-33 indicate the conditions E and $\Delta E$ and the manipulated variable $\Delta U$ for RULE 3.

If the fuzzy set of RULE 1 is that E is negative and slightly large (Graph 3-11) and $\Delta E$ is almost 0 (Graph 3-12), $\Delta U$ should be made positive and slightly large (Graph 3-13).

Here, the set "negative and slightly large" will be explained with reference to an example having numeral values $(-5, -4, -3, -2, -1)$. By partitioning the adaptivity degree $\mu$ and the element by "/", the fuzzy set F can be expressed: $F=(0.2/-5, 0.5/-4, 1/-3, 0.5/-2, 0.2/-1)$. It is a matter of course that, when the adaptivity degree $\mu$ is handled by a microcomputer, these values are suitably normalized into a binary code for easy controlling.

The data group of the fuzzy set has a structure in which these elements are converted into an address on a memory, and the adaptivity degree $\mu$ of the elements is stored as dam in the memory.

Now, it is assumed that $E=X1$ and $\Delta E=X2$ are obtained from the measured result. First, the adaptivity degree $\mu 11$ of RULE 1 to the difference E and the adaptivity degree $\mu 12$ of RULE 1 to $\Delta E$ are obtained, and a smaller one will be regarded as the conformity degree for RULE 1. Next, the fuzzy set of $\Delta U$ is made under this conformity degree (the hatched zone in Graph 3-13).

Similarly, the conformity degree for RULE 2 and the conformity degree for RULE 3 are sought, and the fuzzy set of $\Delta U$ is made under the obtained conformity degrees (the hatched zone in Graphs 3-23 and 3-33).

Thereafter, an OR set (Graph 3-4) for the obtained sets for $\Delta U$ (the hatched zone in Graphs 3-13, 3-23 and 3-33) is sought. This is a fuzzy set for the manipulated variable for all RULE 1, RULE 2 and RULE 3. Furthermore, by obtaining a weight point of this set (Graph 3-4), manipulated variable to be actually operated at this time can be obtained.

If the above mentioned operation is performed in a software manner, it is necessary that the adaptivity of the rules to the difference E, the adaptivity of the rules to $\Delta E$, and tit adaptivity of the rules to $\Delta E$ are previously stored in respective addresses in the memory corresponding to E, $\Delta E$ and $\Delta U$, and all zero is stored in a result storing area (Graph 3-4) as an initial value.

Step (1) From the address corresponding to X1 and X2, the adaptivity of RULE 1 to the difference E and the adaptivity of RULE 1 to $\Delta E$ are obtained, and then, compared with each other, so as to select a smaller one as the conformity degree for RULE 1.

Step (2) Data in the data group storing the adaptivity degree for $\Delta U$ is compared with the conformity degree obtained in the step (1), and a smaller one is stored in a temporary register (not shown).

Step (3) The value of the temporary register is compared with data stored in the result storing area (Graph 3-4), and a larger one is stored in the result storing area (Graph 3-4).

Step (4) The above steps (2) and (3) are repeated in a looped processing the times corresponding to the number of data. The hatched zone in Graph 3-13 is determined by these processings.

Step (5) The above steps (1) to (4) are performed for RULE 2. With this, the OR set of the hatched zone in Graph 3-13 and the hatched zone in Graph 3-23 is obtained.

Step (6) Similarly, for RULE 3, the above steps (1) to (4) are performed. With this, the OR set (Graph 3-4) of the hatched zone in Graph 3-13, the hatched zone in Graph 3-23 and the hatched zone in Graph 3-33 is obtained.

Step (7) For the OR set (Graph 3-4) obtained in the step (6), a weight point is calculated, so that an actual manipulated variable is obtained.

In the case that the manipulated variable is sought by using the Max-Min method as mentioned above, if the processing is executed by use of only existing instructions in a software manner, a very long time has been required because of branching processings caused by the looped processings.

In addition, a high speed fuzzy chip for exclusively executing the fuzzy inference has been developed, but it is very expensive.

SUMMARY OF THE INVENTION

Accordingly, it is an object of the present invention to provide a microcomputer, which has overcome the above mentioned defect of the conventional one, and which can execute a control based on the fuzzy inference (Max-Min method) at a high speed, and can make a fuzzy chip inexpensive.

The above and other objects of the present invention are achieved in accordance with the present invention by a microcomputer including a processing means, a data storing means and a control means for controlling the processing means and the data storing means, the dam storing means including a group of data indicative of the adaptivity degree to the fuzzy sets, and an area for storing the result of processing, and the microcomputer further including means for designating the group of data, means for designating the area for storing the result of processing, means for storing the conformity degree data, means for storing the number of processings, the microcomputer internally including a fuzzy inference exclusive-instruction, which causes to compare data in the means for storing the conformity degree data with data designated by the means for designating the group of data, so as to select a smaller one, and to compare the selected data with data designated by the means for designating the area for storing the result of processing, so as to store a large one at the area for storing the result of processing, designated by the means for designating the area for storing the result of processing, the above processings being repeated the number of data values in a register included in the means for storing the number of processings, while updating the value of registers in the means for designating the area for storing the result of processing and the group of data.

The above and other objects, features and advantages of the present invention will be apparent from the following description of preferred embodiments of the invention with reference to the accompanying drawings.

DESCRIPTION OF THE PREFERRED EMBODIMENTS

Figure 1:
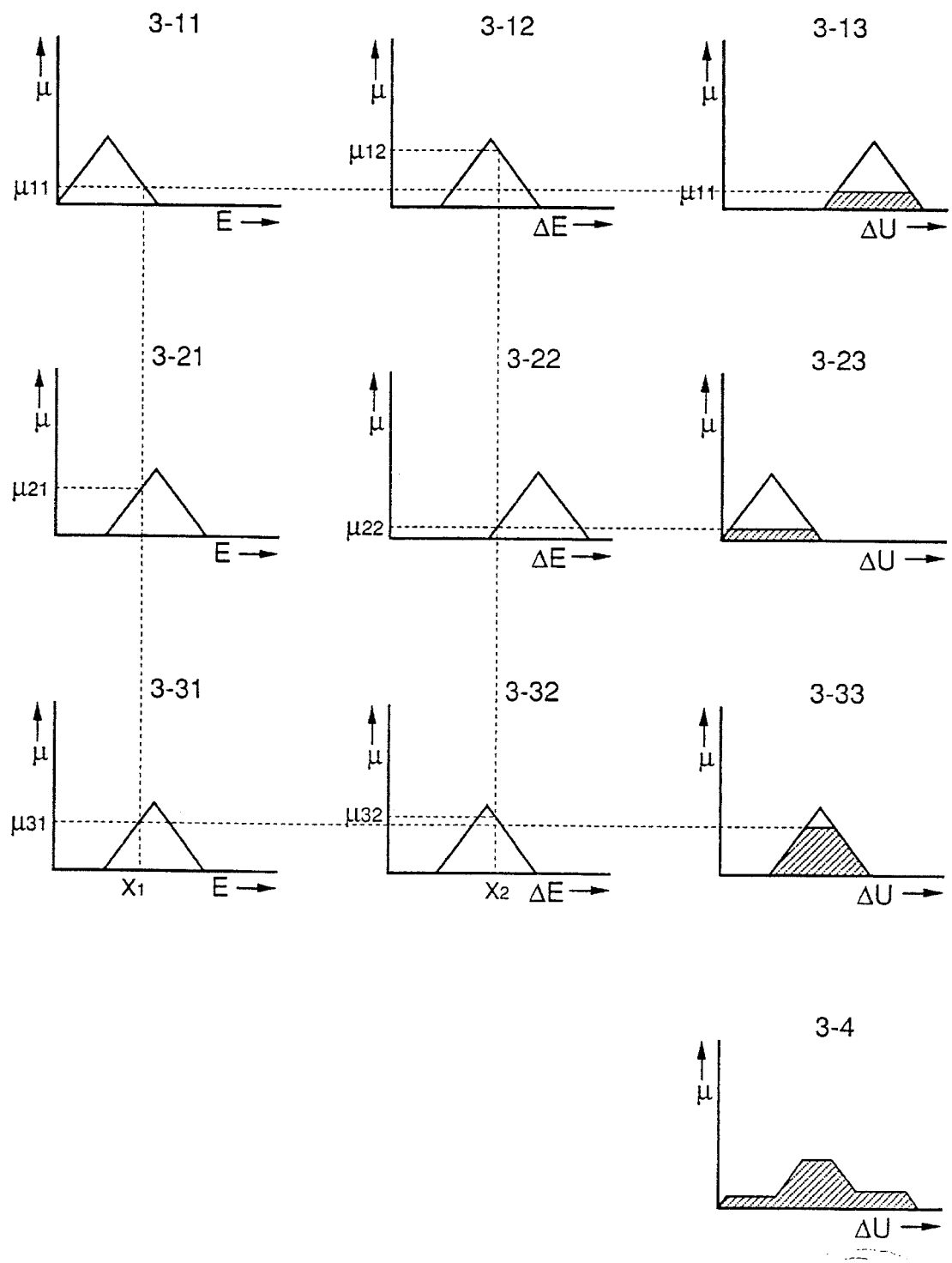
FIG. 1 is a set of graphs for illustrating the fuzzy inference.

Referring to FIG. 1, there is shown a block diagram of a first embodiment of the microcomputer in accordance with the present invention.

The shown microcomputer includes a processor 100, a memory 200 and a controller 300, which are well known to persons skilled in the art as fundamental constituents of the microcomputer, and therefore, a detailed internal structure and explanation thereof will be omitted in the drawing and in the specification, and only pans relating to the present invention will be explained.

Figure 2:
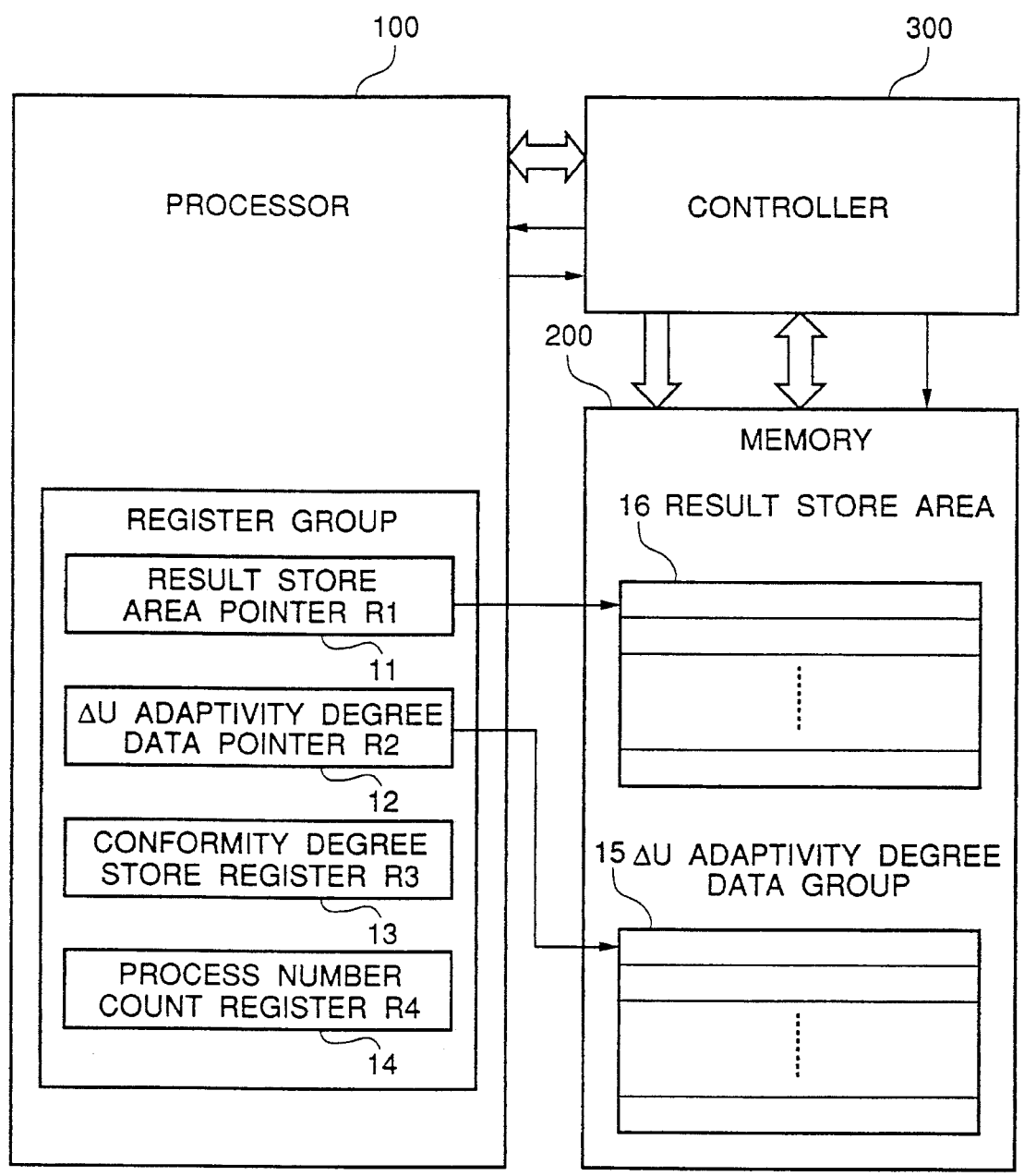
FIG. 2 is a block diagram of a first embodiment of the microcomputer in accordance with the present invention.

As shown in FIG. 2, the processor 100 includes, as registry, a result storing area pointer R1, 11, a ΔU adaptivity degree data pointer R2, 12, a conformity degree storing register R3, 13, and a processing number count register R4, 14, and the memory 200 includes an area 16 for storing data, designated by the result storing am pointer R1, and another area 15 for storing data, designated by the ΔU adaptivity degree data pointer R2.

The result storing area 16 is used to finally store an OR set of sets obtained from respective rules. This result storing area 16 is initialized to zero as an initial value. The result storing area pointer R1, 11 is a register for designating a start address of the result storing area 16. The ΔU adaptivity degree data pointer R2, 12 is a register for designating a start address of the ΔU adaptivity degree data group 15.

The conformity degree storing register R3, 13 is a register for storing a previously obtained conformity degree for the rules, and the processing number count register R4, 14 is a register for setting the number of comparing operations (the number of items of data in the ΔU adaptivity degree data group)

A fuzzy exclusive-instruction of the first embodiment includes the above four registers as an operand, and has an expression format as follows:

MINMAX [R1], [R2], R3, R4

Now, a processing of the first embodiment will be described.

First, a 16-bit data in the ΔU adaptivity degree data group designated by the ΔU adaptivity degree data pointer R2, 12, is compared with a 16-bit data in the conformity degree storing register R3, 13, and a smaller one is stored in a temporary register (not shown).

The data in the temporary register is compared with a 16-bit data in the result storing area 16 designated by the result storing area pointer R1, 11, and a larger one is written back to the result storing area 16 designated by the result storing area pointer R1, 11.

Then, an address in the result storing area pointer R1, 11 and the ΔU adaptivity degree data pointer R2, 12 are incremented by "2", respectively, and the number of processings stored in the processing number count register R4, 14 is decremented by "1".

The above mentioned operation is repeated until the data in the processing number count register R4, 14 becomes zero.

If this instruction is executed for the result storing area 16 by the number of rules, an OR set of the sets which are obtained for the respective rules can be obtained. Incidentally, the steps (2) to (4) explained in the "Description of related art" are executed with this one instruction.

Incidentally, the data length was 16 bits in the embodiment mentioned above, but the data length can be easily modified to for example 8 bits or 32 bits, by changing the increment width of the result storing area pointer R1, 11 and the ΔU adaptivity degree data pointer R2, 12 and the data length of the conformity degree storing register R3, 13.

Now, a second embodiment will be described with reference to FIG. 3, which is a block diagram of an essential part of a second embodiment of the microcomputer in accordance with the present invention.

Figure 3:
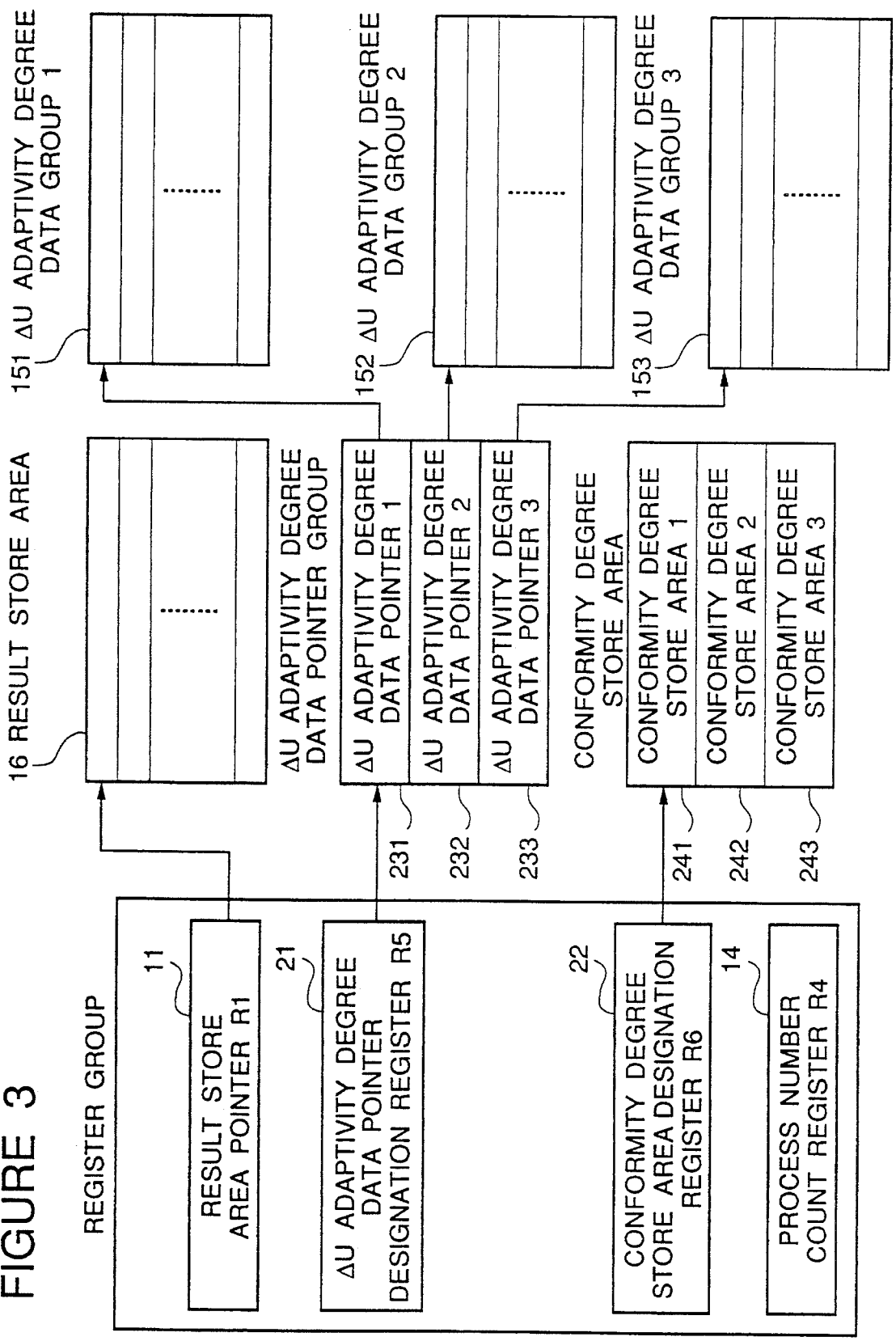
FIG. 3 is a block diagram of an essential part of a second embodiment of the microcomputer in accordance with the present invention.

In FIG. 3, a result storing area pointer R1, 11, a processing number count register R4, 14 and a result storing area 16 are the same as corresponding ones of the first embodiment shown in FIG. 2, and therefore, explanation thereof will be omitted.

In the second embodiment shown in FIG. 3, a ΔU adaptivity degree data group 1, 151 is a ΔU adaptivity degree data group for RULE 1. Similarly, a ΔU adaptivity degree data group 2,152 is a ΔU adaptivity degree data group for RULE 2, and a ΔU adaptivity degree data group 3,153 is a ΔU adaptivity degree data group for RULE 3.

A ΔU adaptivity degree data pointer 1,231 is a data pointer for designating a start address for the ΔU adaptivity degree data group 1,151 for RULE 1. Similarly, a ΔU adaptivity degree dam pointer 2,232 is a data pointer for designating a start address for the ΔU adaptivity degree dam group 2,152 for RULE 2, and a ΔU adaptivity degree data pointer 3,233 is a data pointer for designating a start address for the ΔU adaptivity degree data group 3,153 for RULE 3.

A conformity degree storing area 1,241 is a conformity degree storing area for storing the previously obtained conformity degree for RULE 1. Similarly, a conformity degree storing area 2,242 is a conformity degree storing area for storing the previously obtained conformity degree for RULE 2, and a conformity degree storing area 3, 243 is a conformity degree storing area for storing the previously obtained conformity degree for RULE 3.

A ΔU adaptivity degree data pointer designating register R5, 21 is a data pointer designating register for designating an address of the ΔU adaptivity degree data pointer 1,231, and a conformity degree storing area designating register R6, 22 is a data pointer designating register for designating an address of the conformity degree storing area 1,241.

A fuzzy exclusive-instruction of the second embodiment includes, as an operand, four registers of the result storing area pointer R1, processing number count register R4, the ΔU adaptivity degree data pointer designating register R5 and the conformity degree storing area designating register R6. The fuzzy exclusive-instruction has an expression format as follows:

REPn

MINMAX [R1], [R5], [R6], R4

Here, the instruction labelled "REPn" is an instruction indicating that an instruction next to the instruction "REPn" is repeated "n" times, In this case, "n" corresponds to the number of rules for the fuzzy control. In the embodiment shown in FIG. 3, "n"=3.

Now, a processing of the second embodiment will be described with reference to FIGS. 2 and 3.

First, an address value in the result storing area pointer R1, 11 is stored in a first temporary register (not shown), and the number of processings stored in the processing number count register R4 14 is stored in a second temporary register (not shown).

ΔU adaptivity degree data group 1,151 is referred to by using at an address the data in the ΔU adaptivity degree data pointer 1, 231 designated by the ΔU adaptivity degree data pointer designating resister R5, 21.

A 16-bit data in the ΔU adaptivity degree data group group 1, 151 is compared with a 16-bit data in the conformity degree storing area 1, 241 designated by the conformity degree storing area designating register R6, 22, and a smaller one is stored in a third temporary register (not shown).

The data in the third temporary register is compared with a 16-bit data in the result storing area 16 designated by the first temporary register, and a larger one is written back to the result storing area 16 designated by the first temporary register.

Then, an address in the first temporary register and the ΔU adaptivity degree data pointer 1,231 are incremented by "2", respectively, and the number of processings stored in the second temporary register is decremented by "1". The above mentioned operation is repeated until the data in the second temporary register becomes zero.

Thereafter, an address in the ΔU adaptivity degree data pointer designating register R5, 21 and the conformity degree storing area designating register R6, 22 are incremented by "2", respectively, so that the ΔU adaptivity degree data pointer 2,232 and the conformity degree storing area 2,242 for the next rule are designated.

The above operation is a processing for RULE 1. Since "REPn"(n=3) is designated, the above operation is repeated using the ΔU adaptivity degree data pointer 2,232, the ΔU adaptivity degree data group 2,152, and the conformity degree storing area 2,242 for RULE 2, and also repeated using the ΔU adaptivity degree data pointer 3,233, the ΔU adaptivity degree data group 3,153, and the conformity degree storing area 3,243 for RULE 3. Thus, an OR set of the sets obtained for the respective rules can obtained. Incidentally, the above mentioned operation executes the operation of the steps (2) to (6) mentioned in the "Description of related art".

As mentioned above, since the present invention makes it possible to execute an increased number of processings with one instruction, it is possible to avoid a memory from being pressured by a program. In addition, it is possible to reduce the number of programmed branches such as a branch caused by the loop, a branch based on the result of comparison, so that the processing speed can be increased with adding no hardware.

In the case that the role for determining one manipulated variable from two conditions as in the above mentioned embodiments is applied to twenty rules, when it was executed with only existing instructions, a processing time was about 1000 μs (25 MHz operation), but if the above mentioned fuzzy inference exclusive-instruction was used, the processing time was shortened to about 600 μs.

The invention has thus been shown and described with reference to the specific embodiments. However, it should be noted that the present invention is in no way limited to the details of the illustrated structures but changes and modifications may be made within the scope of the appended claims.

We claim:

1. A microcomputer including:

means for processing data;

means, coupled to said processing means, for storing data; and means for controlling the processing means and the data storing means, the data storing means including a group of data indicative of the adaptivity degree to fuzzy sets, and an area for storing the result of processing, the microcomputer further including:

means, coupled to said data storing means, for designating the group of data;

means, coupled to said data storing means, for designating the area for storing the result of processing;

means, coupled to said processing means, for storing the conformity degree data;

means, coupled to said processing means, for storing the number of processings, the microcomputer internally including a fuzzy inference exclusive-instruction for comparing data in the means for storing the conformity degree data with data designated by the means for designating the group of dam, so as to select a smaller one, and for comparing the selected dam with data designated by the means for designating the area for storing the result of processing, so as to store a larger one at the area for storing the result of processing, designated by the means for designating the area for storing the result of processing, wherein said means for storing the number of processings includes a register for holding a number of data values, wherein said means for designating the area for storing the result of processing and means for designating the group of data each include a register, the above processings being repeated the number of data values in said register included in the means for storing the number of processings, while updating the value of said registers in the means for designating the area for storing the result of processing and the means for designating the group of data, wherein when a plurality of rules are to be elevated, an instruction is executed in a number corresponding to the number of rules to be elevated, while changing the set values of the means for designating the area for storing the result of processing and the means for designating the group of data.

2. A microcomputer according to claim 1, wherein the means for designating the area for storing the result of processing and the means for designating the group of data comprise an input data pointer and an output data pointer, respectively.

3. A microcomputer including:

a processor;

a data memory coupled to said processor and a controller for controlling the processor and the data memory, the data memory including a adaptivity degree data group indicative of the adaptivity degree to fuzzy sets, and an area for storing the result of processing, the processor including an adaptivity degree data pointer coupled to said adaptivity degree data group, a result store area pointer coupled to said area for storing the result of processing, a conformity degree data storing register, and a processing number count register, the microcomputer internally including a fuzzy inference exclusive-instruction for comparing data in the conformity degree data storing register with data designated by the adaptivity degree data pointer, so as to select a smaller one, and for comparing the selected data with data designated by the result store area pointer, so as to store a larger one at the area for storing the result of processing, designated by the result store area pointer, the above processings being repeated the number of processings in the processing number count register, while updating the result store area pointer and the adaptivity degree data group pointer, wherein when a plurality of rules are to be elevated, an instruction is executed by the number corresponding to the number of rules to be elevated, while changing the set values of the result store area pointer and the adaptivity degree data group pointer.

4. A microcomputer according to claim 3, wherein result store pointer and the adaptivity degree data group pointer, respectively.

* * * * *